Sept. 20, 1932.     W. A. VAN BERKEL     1,878,068
TRANSMISSION GEARING
Filed April 3, 1930     2 Sheets-Sheet 2
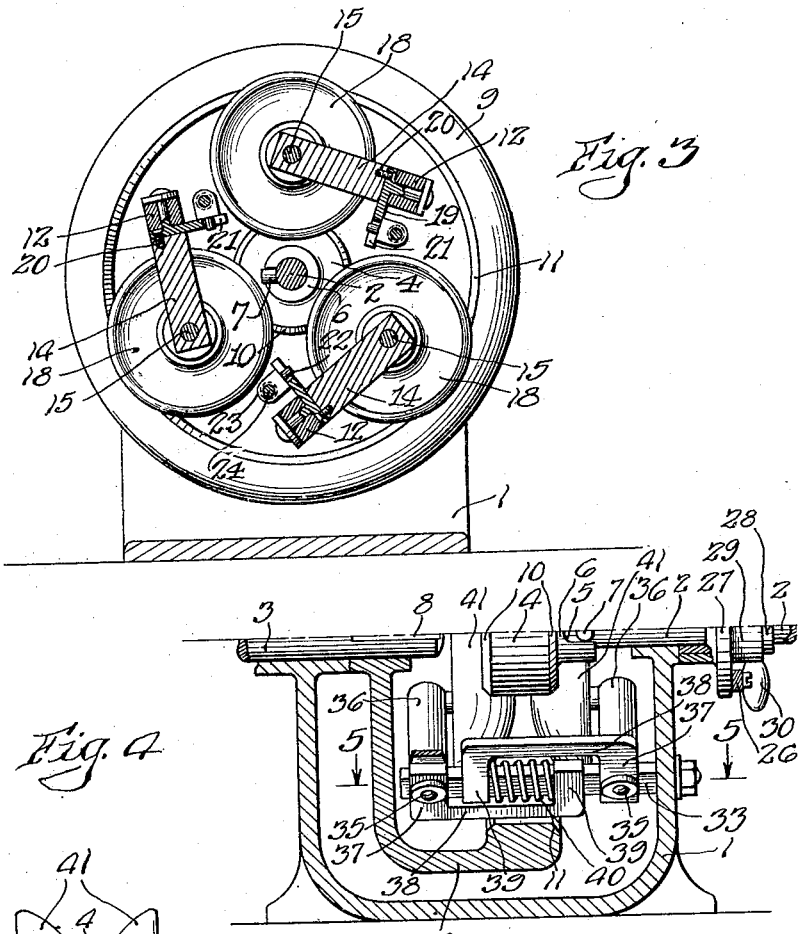
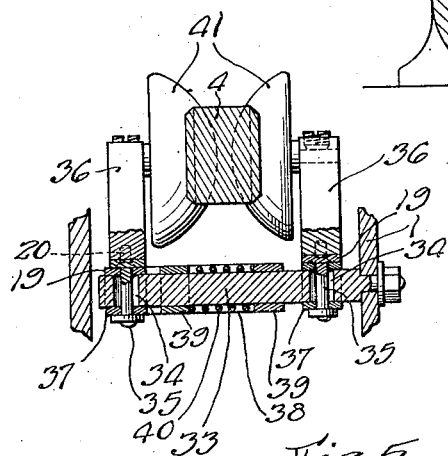

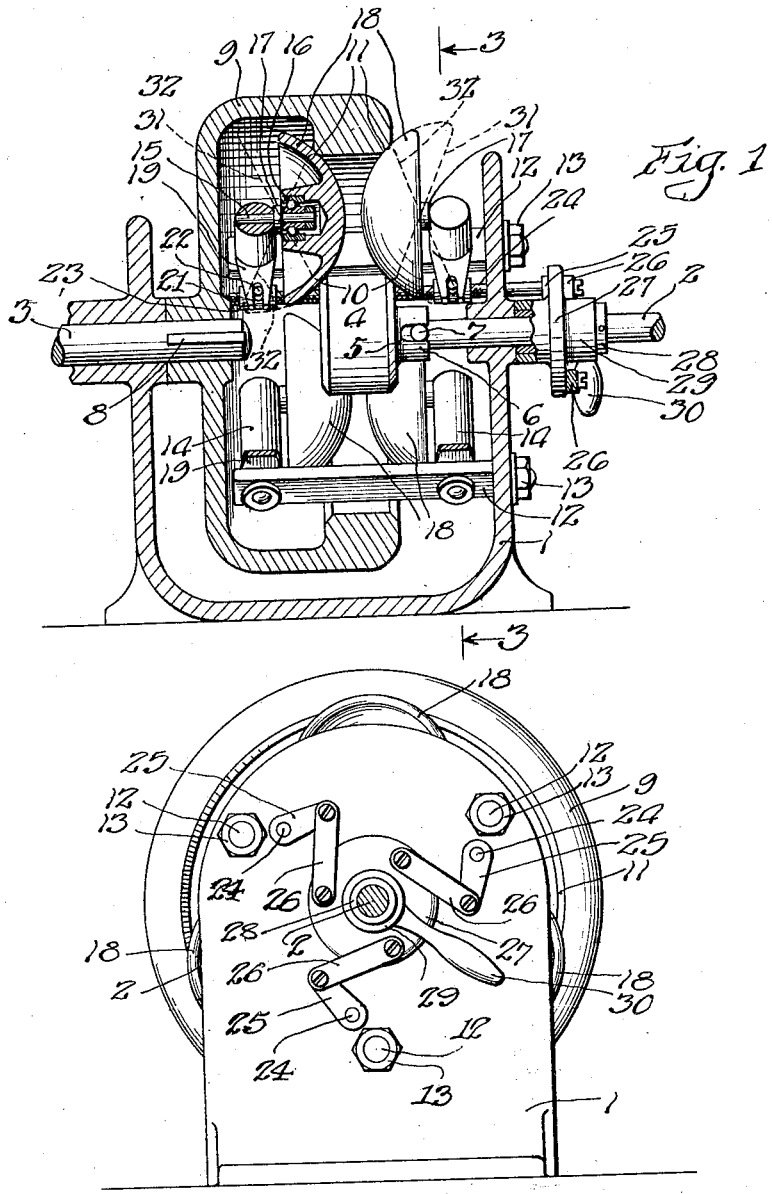

Patented Sept. 20, 1932

1,878,068

UNITED STATES PATENT OFFICE

WILHELMUS ADRIANUS VAN BERKEL, OF CLARENS, SWITZERLAND, ASSIGNOR TO U. S. SLICING MACHINE COMPANY, OF LA PORTE, INDIANA, A CORPORATION OF INDIANA

TRANSMISSION GEARING

Application filed April 3, 1930, Serial No. 441,206, and in Germany April 4, 1929.

It is well known that slicing machine knives work more efficiently if driven at the proper speed but in view of the wide variety of substances which must be sliced by a slicing knife of a slicing machine, it is not possible to fix the driving speed of the knife so that it will efficiently cut all substances. Therefore it is necessary to provide a variable speed driving means or transmission gearing for driving the knife spindle at various speeds and provide means for readily varying the speed whenever desired.

One of the objects of this invention therefore is to provide a variable speed transmission gearing which will make it possible to quickly vary the speed of a slicing knife as desired, even during the rotation of the knife.

Another object of this invention resides in the provision of suitable spherical members interposed between the driving and driven elements, which spherical members have frictional contact with the driving and driven elements. These spherical members are preferably provided with means for tilting their axes of rotation so that the distances from the points of contact between said elements and members may be varied, thus changing the relative speeds of rotation of said driving and driven elements.

Still another object of this invention is to provide suitable operating means for operating the spherical elements to quickly change the relative speeds between the driving and driven elements. This means comprises suitable mechanism for tilting the axes of rotation of the spherical elements.

More specifically an object of this invention is to provide a pair of shafts carrying driving and driven elements with spherical members contacting with the surfaces of said driving and driven elements. The axes of rotation of the spherical members preferably lie within a plane drawn through the axes of rotation of said shafts and the axes of the spherical members are preferably arranged so that when they are tilted about their pivotal supports they will remain substantially in the same plane, although this is not necessarily the case.

In the drawings—

Fig. 1 represents a vertical cross-section taken through a device embodying my invention;

Fig. 2 is an end elevation looking from the right in Fig. 1;

Fig. 3 is a cross-section taken substantially along the line 3—3 of Fig. 1;

Fig. 4 is a cross-section similar to the cross-section shown in Fig. 1 showing only the lower half of the transmission gearing and illustrates a modification of the device shown in Fig. 1; and Fig. 5 is a cross-section on the line 5—5 of Fig. 4.

Referring now particularly to Figs. 1, 2 and 3, the reference numeral 1 represents a casing adapted to support the driving shaft 2 and the driven shaft 3. The driving shaft 2 carries a friction pulley 4 which has a slot 5 arranged in the collar 6 formed rigid with the pulley and a pin 7 on the shaft 2 is arranged within the slot 5 and causes the friction pulley 4 to rotate with the shaft 2 while permitting longitudinal movement of the pulley relative to the shaft. The driven pulley 9 is keyed to the shaft 3 by means of a key 8 and has a cross-section substantially as illustrated in Fig. 1. The pulleys 4 and 9 have beveled edges 10 and 11 respectively.

The brackets 12 are rigidly bolted to the casing 1 at one end thereof and held in place by means of the lock nuts 13. The supports 14 are rotatably mounted in the brackets 12 and carry the spindles 15 at their free end portions and these spindles are secured against rotation within the rotatable members 14. Each spindle carries an anti-friction bearing 16 spaced from its member 14 by means of a collar 17. The anti-friction bearings 16 carry the spherical members 18 and permit free rotation of these spherical members about their respective spindles. These spherical members act somewhat in the nature of idle gears since they are merely instrumentalities for transmitting the rotative movement of the pulley 4 to the pulley 9.

At the base of each of the members 14 and between the members 14 and the brackets 12, I prefer to arrange arms 19 each of which is secured to its respective member 14 by means of a screw 20 as best illustrated in Fig. 3. The arms 19 have slots 21 in their free end portions adapted to receive pins 22 on feed nuts 23. The feed nuts 23 are threaded upon the feed screws 24 each of which has oppositely arranged screw threads at their opposite ends so that the rotation of each feed screw will rotate the two feed nuts which are mounted thereon either toward each other simultaneously or away from each other simultaneously.

Referring now more particularly to Fig. 2, it will be seen that each of the feed screws 24 has an arm 25 secured thereto and connected by means of a link 26 to the disc 27 rotatable on the shaft 2, or preferably as illustrated in Fig. 1 on a sleeve 29 which is interposed between the disc 27 and the rotating shaft 2. The disc 27 is provided with a boss 28 to which is secured a handle 30 which may be used to rotate the disc about the shaft 2.

Rotation of the disc 27 in a counter-clockwise direction (as viewed in Fig. 2) rotates the screw in a clockwise direction and causes the nuts thereon to move toward each other and rock the spherical members 18 into the dotted line positions 31. The clockwise rotation of the disc 27 rotates the screws in a counter-clockwise direction and therefore the nuts 23 are moved outwardly toward the opposite ends of the feed screws and this movement causes the spherical members 18 to move into the dotted line positions 32.

Assuming that the parts are in the full line positions shown in Figs. 1 and 2, it will be noted that the points at which the beveled surfaces 10 engage the spherical members 18 are spaced from the axes of rotation of the spindles 15 substantially the same distance as are the points of engagement of the surfaces 11 with the spherical members 18. However, when the spherical members are rocked into the dotted line positions 31 the distance between the points of engagement of the surfaces 10 with the spherical members 18 and the axes of rotation of the spindles 15 becomes greater than the distance between the points of engagement of the surfaces 11 with the spherical members 18 and the axes of rotation of the spindles 15. Thus, when the pulley 4 drives the spherical members 18 while they are in the dotted line positions, the surfaces 10 engage circles of the spherical members of greater radii than do the surfaces 11, thereby decreasing the speed imparted to the driven pulley 9 by the driving pulley 4.

Just the opposite result occurs when the spherical elements are moved to the dotted line positions 32 for in these positions the spherical members are so arranged as to increase the speed of the driven pulley 9 over the speed of rotation imparted thereto by the pulley 4 when the spherical members are in the full line positions.

The pitch of the threads on the screws 24 may be varied to suit the amount of movement which it is desired to impart to the feed nuts 23 and it will be understood, of course, that any other means may be used for rotatably supporting the spherical members 18, it being understood, however, that it is an essential of my invention to so adjust the axes of rotation of the spherical members as to change the driving speeds between the driving and driven elements.

While I have shown the driving and driven elements as being concentrically mounted with respect to each other, I wish to have it understood that the driving and driven elements may have their axes of rotation parallel to each other and so arranged that the driving element is not surrounded by the driven element as illustrated in Figs. 1 to 3, inclusive. For instance, the driven element 9 could have its outer surface the friction surface and the driving element may be located above the driven element with a single pair of spherical members arranged therebetween.

It is not necessary to have a plurality of spherical members and it is obvious that a single spherical member or a pair of spherical members will operate to perform the intended function, although in the embodiment of my device shown in Figs. 1, 2 and 3 I have preferred to use a plurality of spherical elements in view of the fact that increased friction surface is obtained and a more even distribution of the thrust is insured. I also may use any other form of means for rotating the screws 24.

It will be noted that due to the arrangement of the spherical members 18, there is no end thrust imparted to the shafts 2 and 3, and accordingly there is very little resistance to rotation caused by end thrust as in other devices of like nature. Furthermore, the free connection between the cylindrical member 4 and the shaft 2 comprising the pin 7 and slot 5 prevents any end thrust and accordingly the power drive is more efficient, there is less wear, and if wear does occur, the same is compensated for automatically. This is true particularly where the cylindrical surfaces are in substantially the same normal plane.

In the modification shown in Figs. 4 and 5, I have illustrated a means whereby each pair of spherical elements may be yieldingly urged toward each other to increase the frictional engagement between the spherical members and the driving and driven pulleys. In this arrangement I have provided a support 33 for each pair of spherical members. This support has the slots 34 extending longitudinally thereof and pins 35 extend through the slots 34 and permit rotation of the members 36 rigid with the pins 35 about their own axes, as well as permit movement of the members 36 longitudinally of the support 33. Each of the pins 35 is also rotatable in one arm 37 of a U-shaped member 38, said arm surrounding the support 33 and slidable longitudinally thereon. Each of the U-shaped members 38 has a second arm 39 which also surrounds the support 33 and a spring 40 surrounds the support 33 and is interposed between adjacent arms 39 as best illustrated in Fig. 4. The spring 40 tends to move the arms 39 away from each other and due to the arrangement of the arms 39 the members 36 are drawn toward each other. The spherical member 41 are supported on the members 36 in the same manner as the members 18 in Fig. 1 are supported upon the members 14 and have frictional engagement with the driving and driven pulleys the same as in Fig. 1.

With this modification it will be apparent that the spherical members are yieldingly held in engagement with the driving and driven elements at all times and not only is the frictional engagement therebetween increased, but there also is a tendency to compensate for any irregularities which there may be in either the driven or driving elements or in the spherical members.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United is:

1. In a change speed transmission mechanism, the combination with a driven rotatable element having a pair of friction surfaces facing in a direction toward the axis of rotation of said element, of a second element having its axis of rotation extending in substantially the same direction as said first element and having a pair of friction surfaces opposed to said friction surfaces on said first element, a pair of spherical members each engaging different friction surfaces on said first and second elements, means for supporting said spherical members for rotation about an axis, and means for tilting said last-mentioned means to bring different portions of the surfaces of said spherical members into engagement with the said friction surfaces on said elements.

2. In transmission gearing, the combination with a pair of rotatable supports, spherical members rotatable about axes fixed with respect to their respective supports, of a rotatable feed screw having right and left-hand threads thereon, bifurcated levers carried by said supports, feed nuts co-operating with said right and left-hand threads and also with said bifurcated levers, means for actuating said feed screw to thereby change the angular positions of said axes, and driving and driven elements rotatable about relative fixed axes and each having surfaces adapted to engage both of said spherical members.

3. Transmission gearing comprising driving and driven shafts, a pair of rotatable supports, spindles secured to said supports at an angle to the axis of rotation of said supports, members having friction surfaces rotatably mounted on said spindles, arms rigidly connected to said spindles, feed nuts having operative engagement with said arms, a feed screw in engagement with said feed nuts, and means for actuating said feed screw to vary the inclination of said supports, the surfaces of said members being such that different portions thereof although concentric with their respective spindles are arranged at varying distances from said spindles, a pair of rotatable pulleys secured respectively to said shafts, said members having the surfaces thereof in engagement with said rotatable pulleys and said spindles being adapted to bring different portions of said surfaces into engagement with said pulleys when said spindles have their inclination varied.

4. In transmission gearing, the combination with a driven and a driving shaft, of a drum-shaped member on one of said shafts having a friction surface on the interior thereof, a cylindrical member mounted on the other of said shafts having a friction surface on the exterior portion thereof, supports spaced from each other and arranged between said friction surfaces, a pair of rotatable members mounted on each of said supports, a spindle on each of said members extending toward each other, rotatable elements having spherical surfaces rotatable on said spindles, said spherical surfaces being adapted to engage the friction surface on said drum-shaped member and the friction surface on said cylindrical member, arms on the members which are rotatable on said supports, and means for rocking said arms to rotate said members and tilt said spindles to bring different portions of said spherical surfaces into engagement with the said friction surfaces.

5. In transmission gearing, the combination with a driven and a driving shaft, of a drum-shaped member on one of said shafts having a friction surface on the interior thereof, a cylindrical member mounted on the other of said shafts having a friction surface on the exterior portion thereof, supports spaced from each other and arranged between said friction surfaces, a pair of rotatable members mounted on each of said supports, means for yieldingly urging said members toward each other, a spindle on each of said members extending toward each other, rotatable elements having spherical surfaces rotatable on said spindles, said spherical surfaces being adapted to engage the friction surface on said drum-shaped member and the friction surface on said cylindrical member, arms on the members which are rotatable on said supports, and means for rocking said arms to rotate said members and tilt said spindles to bring different portions of said spherical surfaces into engagement with the said friction surfaces.

6. In a transmission gearing, the combination with a driven and a driving shaft, of a drum-shaped member on one of said shafts having a friction surface on the interior thereof, a cylindrical member mounted on the other of said shafts having a friction surface on the exterior portion thereof, supports spaced from each other and arranged between said friction surfaces, a pair of rotatable members mounted on each of said supports, a spindle on each of said members extending toward each other, rotatable elements having spherical surfaces rotatable on said spindles, said spherical surfaces being adapted to engage the friction surface on said drum-shaped member and the friction surface on said cylindrical member, and means for rotating said rotatable members to tilt said spindles to different angular positions and thereby position the different portions of said spherical surfaces in engagement with said friction surfaces.

7. In a transmission gearing, the combination with a driving shaft, a driven shaft substantially in alignment with said driving shaft, a member secured to one of said shafts having an inner surface facing toward said shaft and provided with pairs of friction surfaces facing in opposite directions from a plane normal to the shaft upon which said member is mounted, a second member on said other shaft having a surface facing out from the shaft upon which it is mounted, and substantially opposed to said first surface, said second member having friction surfaces thereon facing outwardly from a plane normal to the shaft upon which said second member is mounted, the friction surfaces on both of said members being so arranged that a friction surface on one of said members is cut by a plane normal to its axis of rotation and said plane also passing through a friction surface on the other of said members, the remaining friction surfaces on said members being similarly arranged, and spherical members each engaging friction surfaces on both of said members and arranged to prevent longitudinal thrust on the shafts upon which said first mentioned members are mounted, said spherical members being rotatable about axes the angle of which may be varied with respect to the axis of rotation of said shafts.

8. In a transmission gearing, the combination with aligned shafts, a ring-shaped member mounted on one of said shafts having an inner peripheral surface substantially cylindrical in shape, the edges of said cylindrical surface being bevelled, a cylindrical member on the other of said shafts opposed to said first cylindrical surface, the edges of said second cylindrical surface being bevelled and adjacent bevelled surfaces on said first member and said second member being in substantially the same plane normal to the axis of rotation of the respective shafts, spherical members rotatable about axes, the angle of which may be varied with respect to the axes of said shafts, said spherical members each having portions engaging a bevelled surface on each of said first two-named members, and means for adjusting the axis of rotation of said spherical members to vary the relative speeds of said first two-named members.

9. A transmission gearing as claimed in claim 8 in which one of said first two-named members is mounted so as to permit that member to have free movement longitudinally of the axis about which it rotates.

10. In a transmission gearing the combination with shafts, members on said shafts having opposed cylindrical surfaces each provided with friction surfaces at the edges thereof, spherical members rotatable about axes which are adjustable to various angular positions with respect to the axis of said shafts, said spherical members engaging opposed surfaces on each of said first two-named members and tending to force said first two-named members in opposite directions thereby neutralizing end thrust on said shaft, and yielding means for normally moving said spherical members into engagement with their respective friction surfaces.

11. A device as claimed in claim 10 in which a single spring forms the yielding means for moving said spherical members into engagement with their respective friction surfaces.

In testimony whereof I have signed my name to this specification on this 17th day of March, A. D. 1930.

WILHELMUS ADRIANUS van BERKEL.